United States Patent [19]
Riester

[11] 3,716,888
[45] Feb. 20, 1973

[54] WINDSHIELD WIPER ARM

[75] Inventor: William C. Riester, Williamsville, N.Y.

[73] Assignee: Trico Products Corporation, Buffalo, N.Y.

[22] Filed: Aug. 26, 1971

[21] Appl. No.: 175,277

[52] U.S. Cl. ............................................. 15/250.34
[51] Int. Cl. .................................................B60s 1/02
[58] Field of Search.........15/250.34, 250.31, 250.2, 250.3, 15/250.42

[56] References Cited

UNITED STATES PATENTS

| 3,247,541 | 4/1966 | Deutscher | 15/250.34 |
| 3,480,985 | 12/1969 | Forster | 15/250.34 X |
| 2,202,311 | 5/1940 | Folberth et al. | 15/250.34 |
| 3,512,205 | 5/1970 | Rister et al. | 15/250.34 |

Primary Examiner—Peter Feldman
Attorney—E. Herbert Liss

[57] ABSTRACT

A windshield wiper arm assembly includes a retainer for housing and journaling a pivotally mounted wiper arm mounting head and also for supporting a cantilever type self-biasing arm extension member. A spring latch member releasably retains the mounting head fixed with respect to the retainer and also functions to secure the mounting head in position on the driving burr and pivot shaft assembly in a positive operative position.

8 Claims, 4 Drawing Figures

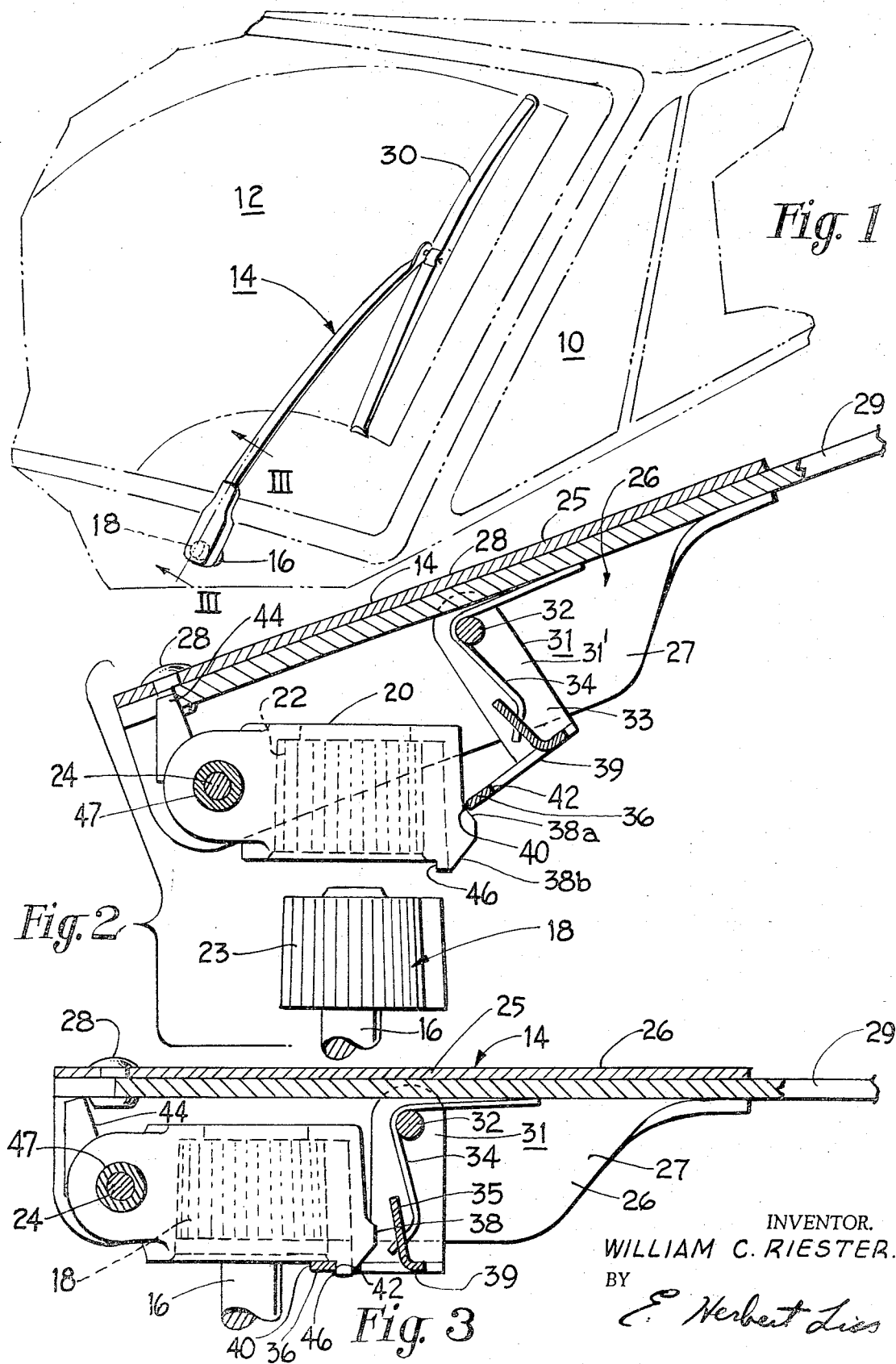

WINDSHIELD WIPER ARM

BACKGROUND OF THE INVENTION

The present invention relates to self-biasing cantilever type windshield wiper arms and more particularly to an improved arm to pivot shaft connection for a cantilever type arm.

Windshield wiper arms of the type currently used on substantially all vehicles employ a mounting head having a serrated recess for mounting on a matched serrated drive burr. The mounting head is hinged to the arm retainer. One or more heavy biasing springs acting between the mounting head and the arm retainer are provided to urge the arm retainer and arm extension to pivot on a hinge axis toward the windshield. With the above described construction, removal and replacement of the arm requires maintaining the arm in the installation attitude against the force of the arm biasing means while sliding the arm onto or off of the drive burr. Special retaining pins or integral latches are used to maintain the arm in the installation attitude.

It has been proposed to eliminate the heavy biasing springs by providing a cantilever arm construction in which the arm extension is pre-stressed to constitute a leaf spring for furnishing biasing force to urge the wiper against the windshield. An example of such a construction is illustrated and described in U.S. Pat. No. 3,480,985, issued Dec. 2, 1969, by Lloyd M. Forster. Cantilever arm construction aggravates the installation and removal problem. It becomes awkward and cumbersome to relieve the biasing force during installation and removal.

SUMMARY

The improved, unique wiper arm construction of the present invention eliminates the need for heavy biasing springs by utilizing a pre-stressed cantilever arm extension, simplifies installation and removal by providing means permanently integrated with the arm for maintaining the arm in the proper attitude for installation or removal and in addition provides positive retention at the arm to pivot shaft connection. Upon installation, a spring biased latch is positively and automatically snapped into a manually releasable retaining position.

The wiper arm extension of this invention in use is substantially straight or may be slightly curved to complement any windshield curvature. It is pre-stressed so that when in operative position on a windshield the arm will transmit the necessary biasing force to a wiper blade assembly for proper windshield wiping action.

The unitary leaf spring arm extension and retainer assembly is hingedly secured to the mounting head which has a recess for receiving a matching serrated drive burr and shaft. This mounting head is nestled in a low profile retainer. It replaces the more massive and complicated box section arm assembly, rigid arm extension, enclosed conventional heavy spring mechanism and spring anchor fittings.

The spring biased latch in addition to releasably securing the arm mounting head on the pivot shaft also precludes relative movement between the mounting head and the arm retainer and arm extension assembly at its hinged axis. When the latch is released the retainer and arm extension can be pivoted about the hinged axis away from the windshield, thereby relieving the biasing force to permit removal of the arm from the pivot shaft.

With the arm stress relieved and the arm retainer pivoted outwardly from the windshield it is possible to slide the mounting head into a fully installed position with the matching serrations on the drive burr. This insures the vehicle operator that the wiper arm is fully engaged before operating the windshield wipers. When the arm is fully engaged with the drive burr the spring biased latch snaps into locking or operative position. The latch cannot assume the locking position unless the parts are fully engaged, thus assuring positive installation.

The principal object of the present invention is to provide a simplified cantilever type windshield wiper arm for a motor vehicle which can be readily removed and replaced.

Another object of the invention is to provide an improved cantilever type windshield wiper arm assembly which assures full engagement of the arm head on the driver, which can be automatically latched in operative engagement and in which the biasing force can readily be relieved for removal and replacement.

Other objects and advantages of the invention will be apparent from the following detailed description taken in connection with the accompanying drawings.

BRIEF DESCRIPTION OF THE DRAWINGS

FIG. 1 is a fragmentary perspective view of a vehicle windshield with the wiper arm and blade installed;

FIG. 2 is a fragmentary exploded section view of an arm retainer and knurled driver in installation attitude;

FIG. 3 is a fragmentary sectional view of an arm retainer taken along line III—III of FIG. 1.

DETAILED DESCRIPTION OF THE PREFERRED EMBODIMENT

Figure 4:
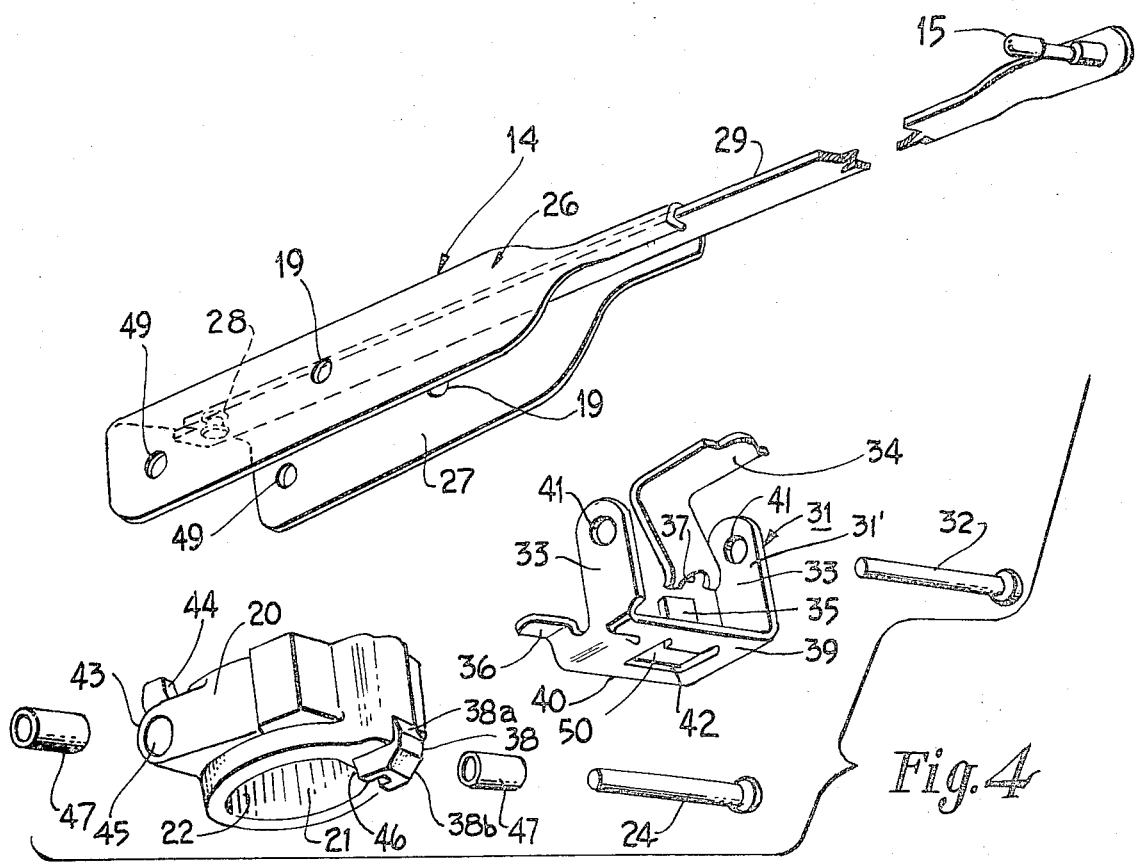
FIG. 4 is an exploded perspective view of the complete wiper arm assembly.

In FIG. 1 there is illustrated a motor vehicle 10 having a windshield 12. On the windshield 12 is shown a wiper arm assembly 14 mounted on a drive shaft 16. The drive shaft 16 carries a drive burr 18 which is received in a recess 21 formed in mounting head or mounting means 20 of the wiper arm assembly 14. Matching internal serrations 22 of mounting head 20 match and mesh with the complementary serrations 23 on drive burr 18. The mounting head 20 of the arm assembly 14 is hinged on an axis formed by pin 24 located in the channel shaped retainer 26. The mounting head 20 may be nestled within the retainer 26. Rigidly secured to the retainer 26 and extending radially from mounting head 20 is cantilever spring arm extension 29. Arm extension 29 is fastened at its inboard end by rivet 28. The outboard end of retainer 26 may be crimped about the arm extension 29. At the outer end of arm extension 29 is a blade attaching pin 15 which may be inserted into a latching receptor on wiper blade 30. Wiper blade 30 is carried by arm 14 across the windshield in a typical reciprocal wiping action as is known to those familiar with the art. The use of a cantilever type arm extension member 29 fastened in retainer housing 26 eliminates the need for a heavy biasing spring assembly such as is currently used on conventional windshield wiper installations. This keeps the size of the retainer 26 to a minimum and also provides a lower silhouette.

The retainer 26 is U-shaped in transverse section. It comprises a pair of side walls 27 and a top wall or web 25. Releasable latching means are provided which include a latch assembly 31 having a latching element 31' disposed within retainer 26 between walls 27. Latching element 31' includes a base 39 and a pair of ears 33 projecting normal to opposing edges. The ears 33 have aligned openings 41. Side walls 27 of retainer 26 also have aligned openings 19 which are aligned with openings 41 of latching element 31'. Pin 32 is received in openings 19 and 41 to pivotally retain latch element 31'. A substantially L-shaped leaf spring 34 is journaled about pin 32 and held in compression between the portion of arm extension 29 underlying top wall 25 of retainer 26 around pin 32 and a struck up tab 35 in base 39 of latch element 31'. The spring 34 is bifurcated at its end as at 37. The bifurcated end 37 of spring 34 embraces struck up tab 35. Spring 34 so retained biases latch element 31' about pin 32 in a clockwise direction as viewed in FIGS. 2 and 3.

A laterally extending tab 36 projects outwardly from base 39 and ear 33 for manually actuating and rotating latch element 31' about its pin 32 against the bias of spring 34.

Mounting head 20 is substantially cylindrical and includes internally serrated recess 21 for receiving drive burr 18. A boss 43 at its rear end is apertured as at 45 to receive hinge pin 24 and bearing 47. Extending upwardly from the boss intermediate its side edges is a stop 44. At the lower forward edge of the mounting head adjacent the open end of the recess 21 is a double ramp caming surface 38 with the ramps 38a and 38b converging outwardly from the surface of the mounting head 20. The mounting head 20 is disposed between the walls 27 of retainer 26 with aperture 45 extending between aligned openings 49 in the side walls of the retainer 26. The pin 24 extends through the aligned openings 49 in aperture 45 and through bearing 47 disposed in aperture 45. The pin 24 is headed at each end externally of the side walls 27 to provide a firm assembly. Thus the mounting head 20 is positioned rearwardly of but adjacent to latch assembly 31 with the caming surface 38 extending toward the base 39 of latch element 31.

In operative position, FIG. 3, the base 39 of latch element 31' underlies the edge of mounting head 20 and a portion of the undersurface of drive burr 18. An edge or latching face 42 of the opening 50 forming a latching hasp engages the rear face or shoulder 46 of ramp 38b which rear face 46 projects below the edge of recess 21 forming a latching keeper. Thus the latch performs the dual function of retaining the mounting head on the drive burr since the base 39 thereof also underlies a portion of the drive burr 18 and at the same time the mounting head is held rigid against relative motion with respect to the retainer 26. Thus the wiper blade 30 is biased to engage the windshield with a force provided by the pre-stressed leaf spring arm extension 29.

By exerting pressure on tab 36 in a counterclockwise direction about pin 32 against bias of spring 34 latch 31 is disengaged from mounting head 20, allowing retainer 26 and arm extension 29 to move in a counterclockwise direction away from mounting head 20 until stop 44 on head 20 abuts against the rear of arm extension 29 to the position shown in FIG. 2.

The upper surface of ramp section 38a in the unlatched or unlocked position engages the leading edge 40 of latch element 31'. Latch element 31' being spring biased in a clockwise direction holds mounting head 20 in an unlatched position as shown in FIG. 2 allowing drive burr 18 to be installed or removed readily from matching surface 22 of mounting head 20.

When installing the arm assembly 14, the drive burr 18 may be slidably engaged with serrations 22 of mounting head 20. After drive burr 18 is in full engaged position with mounting head 20 application of slight additional force to the retainer 26 and arm extension assembly in a clockwise direction will cause leading edge 40 to ride down ramps 38a and 38b. Leaf spring 34 will bias latch face 42 into engagement with shoulder 46. Retainer 26 will assume its operating position as shown in FIG. 3. This provides a solid workable arm assembly with a leaf spring cantilever arm extension 29 urging the wiper blade against the glass with suitable arm pressure.

It should now be apparent that a unique wiper arm assembly has been provided wherein arm pressure against the windshield is achieved in a simple and efficient manner to permit installation and removal, and also insuring that the mounting head will be properly and fully engaged and latched on the drive burr when installed. A certain specific embodiment of the invention has been described for the purpose of illustration but it will be apparent that various modifications and other embodiments are possible within the scope of the invention. It is to be understood, therefore, that the invention is not limited to the specific arrangement shown but in its broadest aspect it includes all equivalent embodiments and modifications which come within the scope of the invention.

What is claimed is:

1. A windshield wiper arm assembly comprising a retainer, a cantilever supported leaf spring formed to exert pressure on a windshield wiper blade for biasing the blade against the windshield secured at one end to said retainer, blade securing means secured at the other end of said leaf spring for attaching a wiper blade to said arm assembly, mounting means pivotally secured to said retainer for attaching said arm to a pivot shaft and releasable latching means for retaining said mounting means in operative position relative to said retainer.

2. A windshield wiper arm assembly according to claim 1 wherein said mounting means includes a recess for receiving a complementary pivot shaft drive burr in driving engagement therewith.

3. A windshield wiper arm assembly according to claim 1 wherein said latching means is pivotally mounted on said retainer and includes a latching hasp disposed adjacent said mounting means.

4. A windshield wiper arm assembly according to claim 1 wherein said mounting means is nestled within said retainer.

5. A windshield wiper arm assembly according to claim 3 wherein said mounting means includes a latch keeper for engagement with said latching hasp.

6. A windshield wiper arm assembly according to claim 5 wherein said latching means is spring biased to urge said hasp into engagement with said latch keeper.

7. A windshield wiper arm assembly according to claim 6 wherein said mounting means includes a camming surface for directing said latching hasp into engagement with said latch keeper when said retainer is pivoted toward said mounting means.

8. A windshield wiper arm assembly according to claim 2 wherein a surface of the latching means includes a portion of said recess when in latched position to thereby positively retain the mounting means on a drive burr.

* * * * *